US005112186A

United States Patent [19]

Katz

[11] Patent Number: 5,112,186

[45] Date of Patent: May 12, 1992

[54] METHOD OF LEVELING A LATERIAL FILE CABINET

[76] Inventor: Edward R. Katz, 4847 Cambridge Dr., Dunwoody, Ga. 30338

[21] Appl. No.: 645,803

[22] Filed: Jan. 25, 1991

[51] Int. Cl.[5] .......... B65G 7/00

[52] U.S. Cl. .......... 414/786; 248/645; 414/627

[58] Field of Search .......... 414/786, 737, 627, 589, 414/590, 591, 606, 607, 618-620, 626, 639-642, 680, 729, 736; 294/64.1, 65; 248/649, 650

[56] References Cited

U.S. PATENT DOCUMENTS

| | | | |
|---|---|---|---|
| 2,899,088 | 8/1959 | Corbin | 294/65 |
| 2,942,745 | 6/1960 | Horton | 414/627 |
| 3,115,262 | 12/1963 | Avery | 414/627 |
| 3,230,002 | 1/1966 | Olson | 414/627 |
| 3,486,964 | 1/1970 | Riley | 414/737 |
| 4,676,713 | 6/1987 | Voelpel | 414/737 |
| 4,946,335 | 8/1990 | King et al. | 294/65 |

FOREIGN PATENT DOCUMENTS

| | | | |
|---|---|---|---|
| 1208247 | 12/1965 | Fed. Rep. of Germany | 414/627 |
| 1382820 | 3/1988 | U.S.S.R. | 414/627 |

OTHER PUBLICATIONS

"Fix-It-Yourself Manual", Reader's Digest Association, Inc., Pleasantville, N.Y., 1977, p. 279.

*Primary Examiner*—Sherman D. Basinger
*Attorney, Agent, or Firm*—Needle & Rosenberg

[57] ABSTRACT

A method of leveling a cabinet comprising the steps of lifting the cabinet off of the ground, inserting safety blocks underneath the raised cabinet, adjusting one or more of the adjustable feet which depend from the cabinet corners, lowering the cabinet to the ground, checking the level of the cabinet and repeating the above steps until the cabinet is level.

2 Claims, 2 Drawing Sheets

METHOD OF LEVELING A LATERAL FILE CABINET

BACKGROUND OF THE INVENTION

The present invention relates to an improved method of leveling lateral file cabinets.

Moving and leveling file cabinets are labor intensive tasks that present special problems. File cabinets in use are generally fully loaded and are usually placed side-by-side in a group, substantially in contact with each other. A fully-loaded lateral file cabinet weighs an average of 900 pounds, and, thus, the leveling of such a cabinet has to be accomplished with the drawers empty. Unloading and reloading the contents of such a file cabinet, normally having five drawers of lateral files, requires up to two man-hours of labor. If a file cabinet is not unloaded, moving it presents special problems because such cabinets are made of light weight sheet metal which is easily bent.

Likewise, leveling a fully-loaded, lateral file cabinet poses similar special problems. Leveling such a file cabinet requires that the cabinet be pulled out from its position adjacent to other file cabinets. Pulling a fully loaded file cabinet from its original position will damage the floor or carpet upon which it rests and also requires substantial labor since the cabinet must be moved in and out from its original position repeatedly to accomplish the leveling. In addition to adjusting the feet at the base of a lateral file, the cabinet must be tilted which will usually distort and damage the side walls of the cabinet.

It is desirable to balance or level a cabinet so that the drawers do not torque, thus making them hard to open and close. Another reason that lateral file cabinets need to be leveled is that OSHA now requires side-by-side lateral cabinets to be bolted together to minimize the danger of their falling upon the user, particularly if two or more drawers are opened by accident. The complimentary holes in the adjacent cabinets which receive therethrough the bolts need to be in alignment which can only be accomplished by the leveling of the cabinets.

The use of a vacuum crane to lift a file cabinet for leveling overcomes the special problems of moving and leveling a fully-loaded file cabinet by enabling the cabinet to be lifted in place without damage to the walls of the cabinet and without damage to the floor or flooring material beneath the cabinet. Additionally, the cabinet may be leveled without the need to unload and reload the contents of the cabinet.

SUMMARY OF THE INVENTION

It is an object of the present invention to provide an improved vacuum crane for lifting, moving and leveling lateral file cabinets and the like. It is a further object of the invention to provide a method for leveling a file cabinet by lifting said cabinet in place without the need for unloading and reloading the contents of such a cabinet and without the need for tilting the cabinet or moving it out from its normal position in use.

The objects of the present invention are accomplished by providing a method of leveling a file cabinet by lifting the cabinet in place with a suction crane, adjusting the adjustable feet of the cabinet, returning the cabinet to the floor, checking the level of the cabinet and repeating the steps until the cabinet is level. To prevent injury to laborers while the cabinet is raised, the invention provides for safety blocks to be placed between the cabinet and the floor.

A vacuum crane generally includes an adjustable suction lift assembly which is placed on top of a cabinet. Vacuum is then applied to the suction lift assembly and the crane is moved upwardly, the cabinet is lifted upwardly.

DETAILED DESCRIPTION OF THE PREFERRED EMBODIMENT

Figure 1:
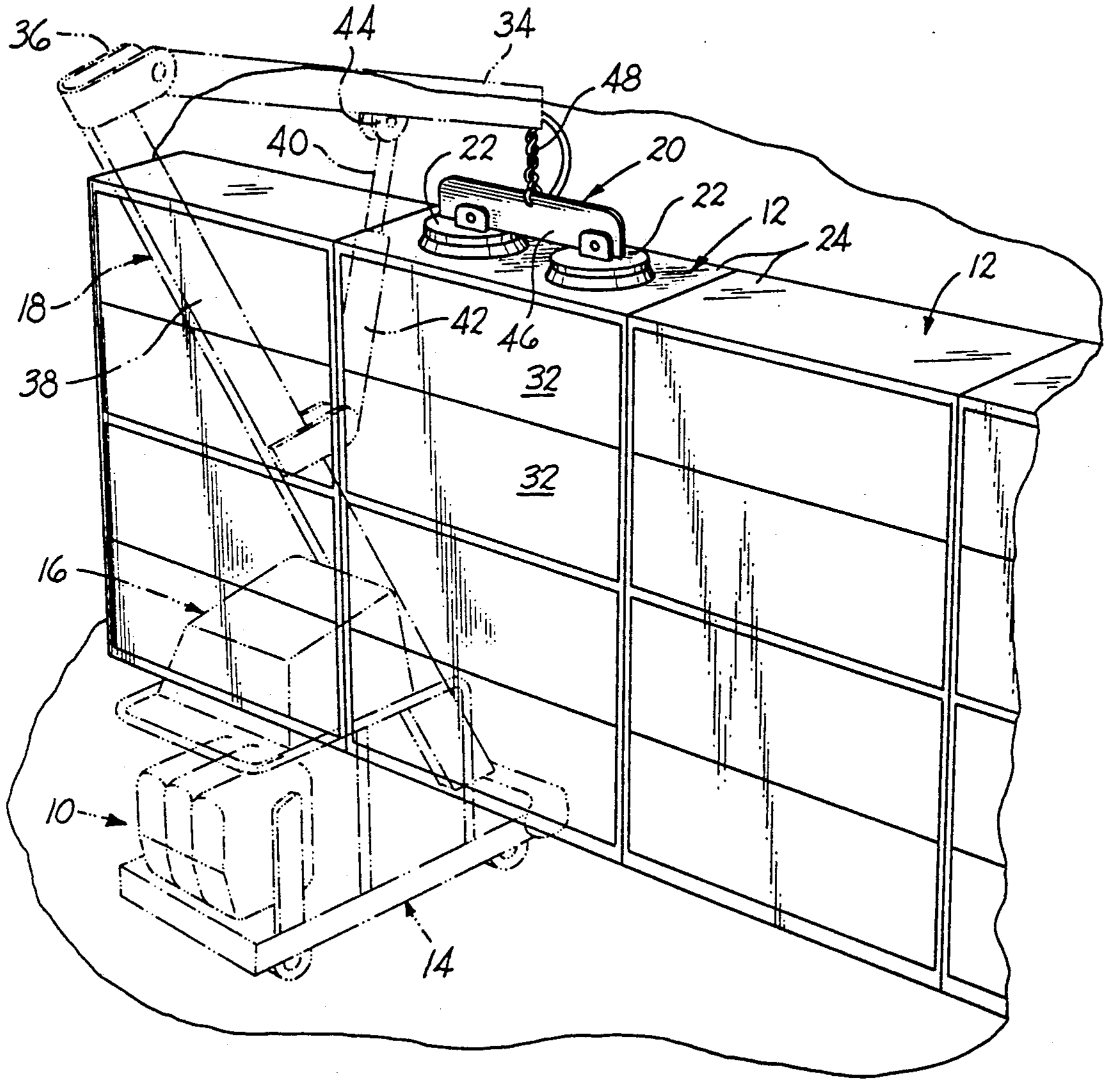
FIG. 1 is a perspective view of the entire apparatus utilized in the method of moving and leveling file cabinets according to the present invention.

Referring to the figures of the drawings, the numeral 10 refers generally to a device for lifting and leveling a lateral file cabinet 12. The device 10 comprises a wheeled base 14 that supports the suction controls 16, a hydraulically operable crane 18 and a suction assembly 20 with a pair of spaced suction heads 22. The cabinet 12 has a flat top 24, sides 26 and bottom 28. Adjustable feet 30 depend from each of the bottom corners of the cabinet 12. A plurality of drawers 32 extend across the front face of the cabinet 12 which is shown within a typical side-by-side array of similar cabinets 12 found in a office environment. The cabinets 12 can also be positioned in a back-to-back relationship.

The crane 18 includes a forwardly extending lifting boom 34 that pivots about a horizontal axis at its rear end through bracket 36 which is connected to upright support 38 that is secured to the forward end of base 14. A piston 40 that is slidable within hydraulic cylinder 42 is connected, at its other end, through bracket 44 to the underside of boom 34. The suction heads 20 are mounted on frame 46 which is connected through chain 48 to the forward end of boom 34.

Figure 2:
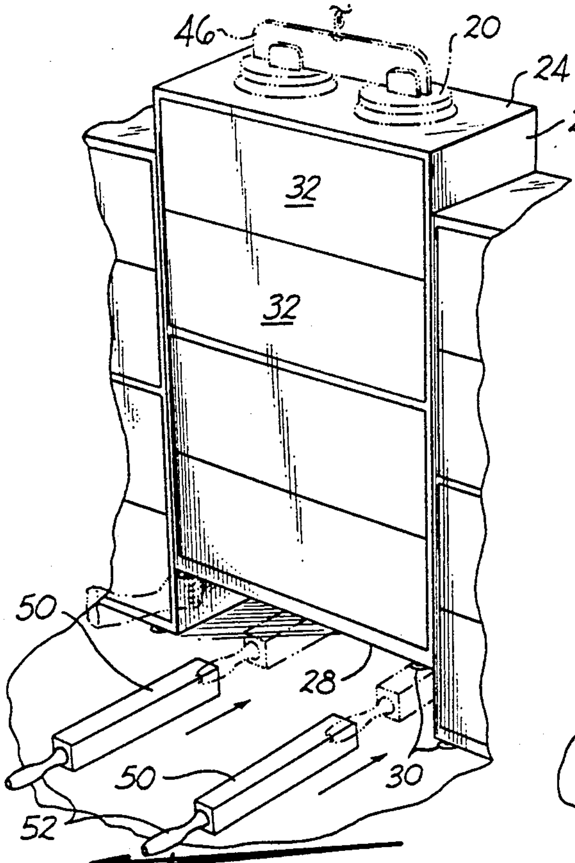
FIG. 2 is a perspective view showing a lateral cabinet being raised with the placement of the safety blocks there beneath.

As seen in FIG. 2, a pair of rectangular-shaped safety blocks 50 are provided with gripping handles 52 at their rear ends. The blocks 50 are of sufficient height so that if the cabinet 12 were to fall accidentally from its raised position, as described below, it would not crush the hands of the operator who was adjusting the feet 30 on the cabinet 12.

The device 10 is used to balance a file cabinet 12 that is not leveled as follows: A conventional carpenter's level (not, shown) is placed across the top 24 of the cabinet to ascertain how much off-center is the horizontal bubble indicator within the level. The device 10 is then moved in front of the file cabinet 12 and the suction assembly 18 is placed on top 24 of the cabinet 12 by adjusting the suction heads 20 so that each suction head 20 is located near opposite ends of the top 24 of the cabinet 12. The assembly 18 is placed off-center with respect to the front and back of the cabinet 12 and closer to the front than to the back, so that when the cabinet 12 is lifted, its bottom 28 will swing slightly forward with respect to the vertical, allowing gravity to maintain the cabinet drawers 32 closed.

A vacuum is applied through the suction heads 20 and boom 34 is elevated by operation of the hydraulic cylinder 42 that acts on piston 40. The cabinet 12 is raised sufficiently off the ground so that the safety blocks 50 may be placed thereunder, which is usually 6–7 inches.

One or more of feet 30 are appropriately adjusted. The safety blocks 50 are then removed from beneath the cabinet 12 and the crane boom 34 is lowered with the top 24 of the file cabinet 12 still attached to the suction assembly 22 until the bottom of the feet 30 reach the floor. The level of the cabinet 12 is then rechecked and the above steps are repeated, if necessary, to complete the leveling of the cabinet 12.

Figure 3:
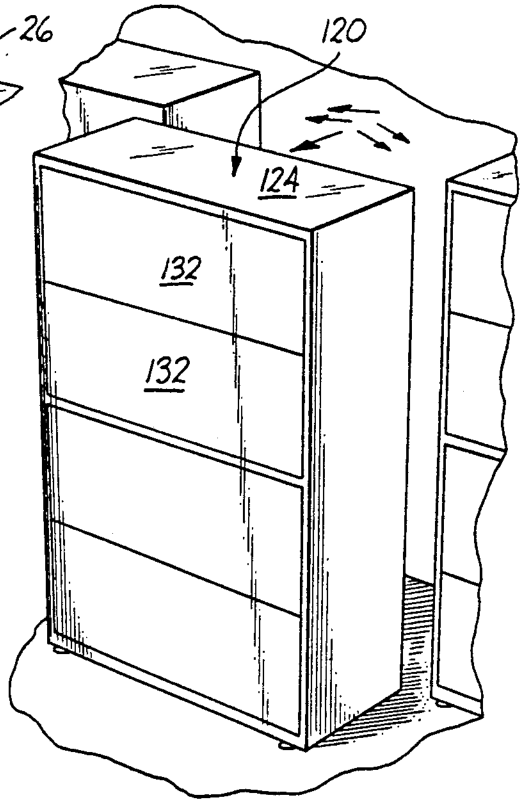
PRIOR ART FIG. 3
FIGS. 3 and 4 are perspective views of a lateral cabinet being leveled in accordance with the prior art
Figure 4:
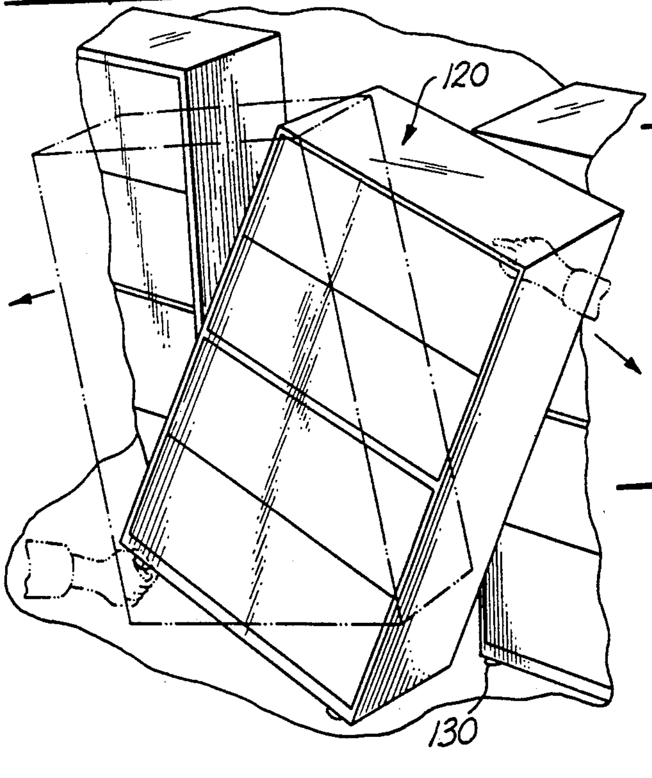
PRIOR ART FIG. 4

FIGS. 3 and 4 depict the common but arduous task of balancing or leveling a cabinet 120 without lifting the same. The drawers 132 would each have to be emptied. The cabinet 120 would then be slid forward and tipped to one side by one person so as to enable another person to adjust one or both of the exposed adjustable feet 130. The cabinet 120 would be placed in an upright position and the carpenter's level would be placed on the cabinet top 124 to determine if the cabinet 120 had been balanced. If not, the tipping of the cabinet 120 and adjusting of the feet 130 would have to be repeated. That trial and error method could take 20–30 minutes to balance just one cabinet 120 as contrasted with the safer and more efficient method of the present invention.

What I claim is:

1. A method for leveling file cabinets that have adjustable feet, comprising the steps of:

(a) lifting the cabinet completely off of a support surface by means of a vacuum suction lifting device;

(b) placing a safety block between the bottom of the cabinet and the support surface after the lifting step;

(c) adjusting at least one of the adjustable feet of the cabinet;

(d) removing the safety block from between the cabinet and the support surface after the adjusting step is completed;

(e) lowering the cabinet to the support surface;

(f) determining the level of the cabinet; and (g) repeating the above steps until the cabinet is level.

2. The method of claim 1 and further comprising the step of ascertaining the level of the cabinet prior to step (a).

* * * * *

UNITED STATES PATENT AND TRADEMARK OFFICE

CERTIFICATE OF CORRECTION

PATENT NO. : 5,112,186

DATED : May 12, 1992

INVENTOR(S) : Edward R. Katz

It is certified that error appears in the above-indentified patent and that said Letters Patent is hereby corrected as shown below:

On the title page:

In the title, "LATERIAL" should be changed to --LATERAL--.

Signed and Sealed this

Twentieth Day of July, 1993

Attest:

Michael K. Kirk

MICHAEL K. KIRK

*Attesting Officer*

*Acting Commissioner of Patents and Trademarks*